(12) United States Patent
Dal Pozzo

(10) Patent No.: US 8,979,111 B2
(45) Date of Patent: Mar. 17, 2015

(54) BICYCLE ON-BOARD DEVICE AND RELATED MOUNTING METHOD

(75) Inventor: Massimo Dal Pozzo, Rotzo VI (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 13/493,485

(22) Filed: Jun. 11, 2012

(65) Prior Publication Data

US 2012/0313344 A1 Dec. 13, 2012

(30) Foreign Application Priority Data

Jun. 10, 2011 (EP) .................................. 11425156

(51) Int. Cl.
| | |
|---|---|
| *B62J 11/00* | (2006.01) |
| *B62K 19/30* | (2006.01) |
| *B62K 19/40* | (2006.01) |
| *B62J 99/00* | (2009.01) |

(52) U.S. Cl.
CPC ................ *B62J 11/00* (2013.01); *B62K 19/30* (2013.01); *B62K 19/40* (2013.01); *B62J 2099/0013* (2013.01)
USPC ........................ 280/288.4; 180/68.5; 224/425

(58) Field of Classification Search
USPC ........................ 280/288.4; 180/68.5; 224/425
See application file for complete search history.

(56) References Cited

U.S. PATENT DOCUMENTS

| | | | |
|---|---|---|---|
| 675,390 A * | 6/1901 | Keating ......................... 429/99 |
| 6,016,882 A | 1/2000 | Ishikawa | |
| 6,293,448 B1 | 9/2001 | Pietrusynski | |
| 6,923,355 B2 * | 8/2005 | Campagnolo ................ 224/414 |
| 7,243,937 B2 | 7/2007 | Ishikawa | |
| 7,267,352 B2 | 9/2007 | Ishikawa | |
| 7,393,125 B1 * | 7/2008 | Lai ............................... 362/473 |
| 7,422,438 B2 | 9/2008 | Nishimoto | |
| 8,162,191 B2 | 4/2012 | Tetsuka et al. | |
| 8,220,679 B2 | 7/2012 | Yoshida et al. | |
| 8,651,212 B2 | 2/2014 | Vincenz | |
| 2001/0042767 A1 | 11/2001 | Campagnolo | |
| 2001/0045723 A1 | 11/2001 | Niitsu et al. | |
| 2005/0126840 A1 * | 6/2005 | Lin ............................... 180/205 |
| 2005/0280244 A1 | 12/2005 | Watarai | |
| 2010/0320814 A1 * | 12/2010 | Singenberger et al. .. 297/215.13 |
| 2011/0042156 A1 * | 2/2011 | Vincenz ....................... 180/205 |
| 2013/0241170 A1 * | 9/2013 | Talavasek et al. ............ 280/279 |

FOREIGN PATENT DOCUMENTS

| | | |
|---|---|---|
| CN | 201531177 U | 7/2010 |
| DE | 19528569 | 8/1996 |
| DE | 202008014756 U1 | 2/2009 |
| EP | 1553012 | 7/2005 |
| FR | 2564412 A * | 11/1985 |

(Continued)

OTHER PUBLICATIONS

Extended European Search Report for Appln. No. 11425156.4-1254, dated Nov. 15, 2011.

(Continued)

*Primary Examiner* — Kevin Hurley
(74) *Attorney, Agent, or Firm* — Volpe and Koenig, P.C.

(57) ABSTRACT

A bicycle on-board device having a body that includes a containment space and is sized for insertion into a tube of a bicycle frame. The device has fastener locations that are located to match fastener locations on the bicycle frame for attaching cycling items, such as a bottle cage.

5 Claims, 12 Drawing Sheets

(56) References Cited

FOREIGN PATENT DOCUMENTS

| | | | | |
|---|---|---|---|---|
| FR | 2602204 | A | * | 2/1988 |
| FR | 2603859 | A | * | 3/1988 |
| GB | 2260009 | | | 3/1993 |
| GB | 2260009 | A | | 3/1993 |
| NL | 2001779 | C2 | | 1/2010 |
| WO | 0222435 | A1 | | 3/2002 |

OTHER PUBLICATIONS

International Search Report received in PCT/IT2012/100173. International Search Report received in PCT/IT2012/100174.
Office Action issued Jun. 6, 2014 in corresponding European application.

* cited by examiner

BICYCLE ON-BOARD DEVICE AND RELATED MOUNTING METHOD

BACKGROUND

The present invention concerns a bicycle on-board device and more specifically it concerns a device configured to be inserted inside the bicycle frame, as well as a method for mounting it.

Such a bicycle device can be of the stand-alone type or it can be part of an on-board electronic system comprising other electronic and/or electromechanical devices connected by cables or wirelessly.

Bicycle on-board electronic systems are known and are becoming increasingly sophisticated. The on-board device or the system that it is part of can, for example, be intended for controlling and/or managing the gearshift and/or for acquiring, processing and/or storing parameters and/or data relative to the cyclist and/or to the bicycle and/or to the trip. The on-board device or the system that it is part of can also be intended for mobile telephone communication, for multimediality and/or for anti-theft surveillance of the bicycle.

The bicycle on-board device can also merely comprise a battery power supply unit, possibly with associated power supply electronics, for other devices of the on-board electronic system.

US 2001/0042767 A1 and EP 1 553 012 A1 each describe a containment unit for an electronic system for controlling/powering at least one on-board electronic device for a bicycle, having a configuration suitable for fastening outside of the frame at the same attachment point as a bottle cage, and preferably with the same fastening means.

US 2005/0280244 A1 describes a bicycle control apparatus that can be mounted in a seat post and more specifically in a seat post that is detachably mounted in the seat tube. According to this document, the seat post, at its lower end opposite the saddle, comprises a circuit mounting structure like for example an internal threading. The control apparatus comprises a tubular housing, that can be inserted in the seat post, as well as a cover at the lower end of the tubular housing. The tubular housing houses a control unit in the form of a microprocessor, and it has an internal threading at the lower end. The cover is shaped like a stepped bolt comprising: a head, equipped with a tool engaging structure and having an outer diameter that is slightly smaller than the inner diameter of the seat post; a first male threaded portion having a diameter that is slightly smaller than the diameter of the head; and a second male threaded portion having a diameter that is slightly smaller than the diameter of the first male threaded portion. The second male threaded portion is screwed into the internal threading of the tubular housing; then the first male threaded portion is screwed into the internal threading of the seat post. In an alternative embodiment, the housing is mounted in the seat post in a different manner. The first male threaded portion of the cover is replaced by a mounting structure comprising a plurality of movable projections in the form of retaining balls slidingly retained in a corresponding plurality of retaining holes and biased radially outwardly by a corresponding plurality of springs. The mounting structure also includes a plurality of stationary projections in the form of rectangular male splines. In the seat post, the circuit mounting structure comprises, instead of the female threading, a plurality of recesses in the form of hemispherical grooves and a plurality of recesses in the form of female splines. This embodiment, with respect to the first, has the advantage of not subjecting the cables to twisting during assembly into the seat post.

Holes are provided in the tubular housing and in the cover, for the passage of cables for data and energy transport, equipped with respective connectors. Holes are similarly provided in the seat post, for the passage of cables, equipped with respective connectors. There can also be a groove in the inner peripheral surface of the seat post or in the outer peripheral surface of the housing, to house the cables that come out from the cover and lead them upwards, for example towards the top tube of the frame.

Such a control apparatus has a series of drawbacks. Indeed, such an apparatus needs the seat post to have a tubular cylinder shape, while bicycle frames and therefore seat posts with a non-circular cross section are increasingly common, mainly for aerodynamic reasons; moreover, such an apparatus requires a substantial alteration of the seat post to make the circuit mounting structure, which moreover adapts poorly to seat posts made of a composite material such as carbon fibre. Moreover, it requires the disconnection of the signal and power cables whenever one wishes to remove the saddle. Furthermore, since it has to fit into the seat post that is in turn sized to fit in the seat tube of the frame, the apparatus necessarily has a small transversal size. Finally, bicycle frames with integrated seat post, for which such an apparatus is not suitable, are increasingly common.

SUMMARY OF THE INVENTION

The present invention provides an on-board device having an oblong shaped body that defines a containment cavity and is sized for insertion into a portion of a bicycle frame. The device includes fastener locations that match the locations associated with a bottle cage attachment position on the bicycle frame.

BRIEF DESCRIPTION OF THE DRAWINGS

Features and advantages of the invention will become clearer from the description of some preferred embodiments thereof, made with reference to the attached drawings, wherein.

DESCRIPTIONS OF PREFERRED EMBODIMENTS

Introduction

Figure 1:
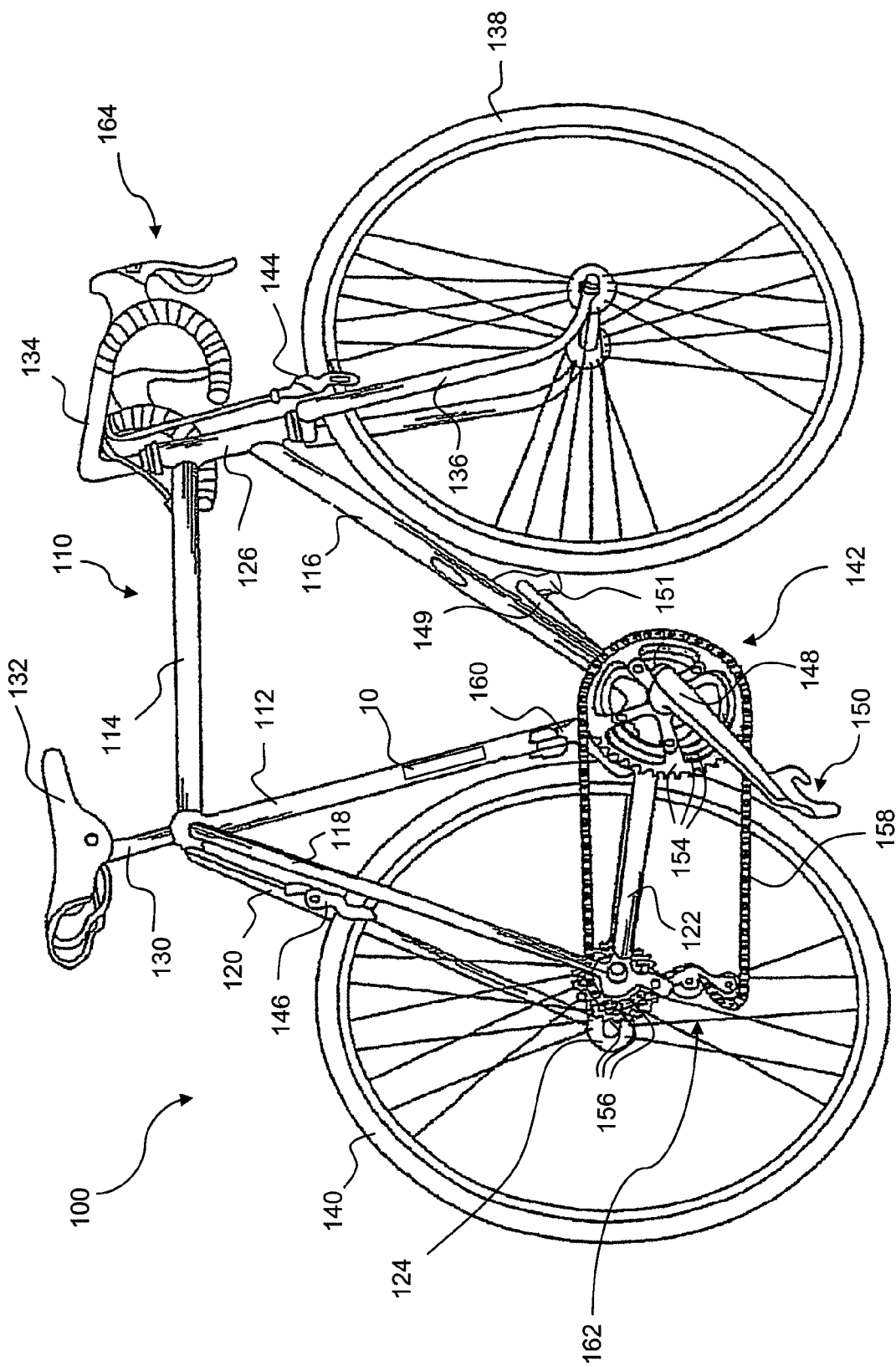
FIG. 1 schematically illustrates a bicycle having an on-board device according to the invention mounted thereto.

In a first aspect thereof, the invention concerns a bicycle on-board device having an oblong shape and comprising a cavity containing a battery power supply unit and at least one circuit board inside it, the device being sized for insertion into a seat tube of a bicycle frame and having at least one fastener that matches a bottle cage fastener location on the bicycle frame.

Typically, bicycle frames have an arrangement for fastening the bottle cage along the seat tube. The capability of insertion of the device inside the seat tube allows the saddle to be removed from the bicycle without disconnecting the connection cables to the other electrical, electronic and/or electromechanical devices of the on-board system. Moreover, the bicycle on-board device is also suitable for bicycle frames with integrated seat post. Furthermore, since it is not necessary to hang the on-board device at the seat post, there is no need to arrange special fastener locations in the seat post, ensuring immediate possibility of application essentially to all bicycle frames and seat posts of the countless manufacturers, even made of a composite material and/or with a non-circular cross section. The weight of the device is also located close to the lowermost point of the bicycle frame, with advantages in terms of stability.

In an embodiment, the fastener location comprises at least one, but preferably two holes having an internal threading matching the external threading of a respective fastener for fastening the bottle cage to the frame. The threaded hole(s) is(are) arranged, in the mounted position of the on-board device, coaxial to a respective insert of the frame. Typically, bicycle frames comprise a pair of internally threaded inserts that, in order to allow suitable length for fastener, project towards the inside of the frame.

Although the term "insert" is used hereinafter for the sake of simplicity, the invention applies to reinforcements in one piece with the frame.

In an embodiment, the internal threading of at least one of the holes is the same as the internal threading of the corresponding insert and it is preferably made in a component having at least one degree of freedom of movement with respect to the rest of the body of the device, so as to facilitate the engagement with the bottle cage fastening screw already screwed into the insert of the frame.

Preferably said component having said internal threading is a bush, housed in a smooth hole of the on-board device and longitudinally biased by a preloaded spring.

Alternatively, the threaded inserts of the frame can be replaced by inserts equipped with smooth holes for the passage of bottle cage fasteners screwed in the on-board device only.

Furthermore, the internal threading of the on-board device and the associated fastening screw can have a diameter that is smaller than the inner diameter of the inserts of the frame, so that the bottle cage fastener are only engage the on-board device, after passing without engagement through the threaded inserts of the frame.

In such embodiments, the on-board device is preferably effectively fixed to the frame at the same time as the bottle cage. In case the bottle cage is to be fixed later or removed, it is suitable to undo a fastener, associate it as necessary with the bottle cage and reattach it to the on-board device, and, if necessary, similarly operate on the second fastener.

In an embodiment that totally separates the two mounting steps of the on-board device and of the bottle cage, an externally and internally threaded fastener element is used. Its external thread passes through the insert of the frame and into the on-board device, and the internal threading is available for fastener associated with the bottle cage.

In another embodiment that separates the two mounting steps of the on-board device and of the bottle cage, the initial fastener includes a stud bolt and a nut, and the stud bolt is screwed into the insert of the frame and into the on-board device, and the bottle cage is fixed to the stud bolt with the nut.

In another embodiment, the fastener is self-threading and comprised of a material in which the threading is created by a self-threading screw and is capable of holding the device.

In an embodiment, the on-board device comprises a groove extending along its main longitudinal direction and sized to receive a portion of at least one insert of the bicycle frame intended for fastening the bottle cage, said at least one fastener is provided on the bottom of the groove.

The groove advantageously provides a constraint against rotation around, and inclination with respect to, a main longitudinal direction of the seat tube of the frame, therefore avoiding stresses and noise. Furthermore, by providing such a groove it is possible to maximize the size of the on-board device, and therefore the available internal space. Indeed, the on-board device can have elsewhere a transversal size essentially corresponding to the internal size of the seat tube of the frame, and in the longitudinal direction it can extend from the housing box of the bottom bracket assembly or slightly above, up to the depth of maximum insertion of the seat post.

Preferably, said groove extends from an end of the device that, in the mounted position of the device, is the lowermost, but it has an abutment surface at its upper longitudinal end. In this way, the on-board device hooks at the upper insert of the frame remaining suspended, ensuring that there is no interference with the shaft of the bottom bracket assembly.

In another embodiment, the device has, at a longitudinal end, alternative fastener for being suspended at a seat post or at the seat tube.

In this way, the on-board device can be alternatively fixed hanging from the seat post, inserted in the seat post, hanging in the seat tube or inserted in the seat tube and fixed at the bottle cage as stated above.

The alternative fastener can comprise an expander for fastening by radial pressure against the inner wall of the seat post or of the seat tube. The expander can be made in a component that can be removably attached to the rest of the device through a joint, like for example a dovetail, bayonet, snap joint, etc. This embodiment allows the adjuster of the expander to be more easily reached. Preferably, the device comprises an oblong hollow body made of a plastic material.

The groove and any fastener and/or alternative fastener can be made in a metal plate capable of being removably associated with the oblong hollow body, for example made of a plastic material. In this way, it is possible to increase the strength and/or make a single oblong hollow body and a series of plates, each adapted to different sizes and/or distances between centres of bottle cage fastening inserts.

Alternatively, at the expenses of the size of the internal cavity, it is possible to provide plural fastening means, for example plural pairs of holes, in different angular positions.

The on-board device can also be equipped with a seat for temporarily connecting a mounting aid.

In an embodiment, the seat has a through hole extending substantially perpendicularly to the main longitudinal direction of the on-board device, even more preferably coinciding with the hole equipped with internal threading corresponding to the lower insert of the frame. In this embodiment, a first end of a semi-rigid cable, like a steel cable, is threaded into the hole of the lower insert of the frame, brought out from the upper end of the seat tube, passed into the through hole, re-threaded into the seat tube and brought out from the housing box of the bottom bracket assembly. By pulling the two ends of the cable away from the frame, the on-board device is positioned correctly, with the internally threaded hole coaxial with the insert of the frame.

In another embodiment, the seat is made in the upper longitudinal end face and consists of a seat, for example a bayonet seat or an internally threaded hole, for temporarily fastening a rigid rod of length such as to still partially protrude from the seat tube when the on-board device is correctly positioned.

Preferably, the oblong hollow body defines a tight cavity.

Preferably, said at least one circuit board comprises a power supply circuit, a microprocessor and a memory.

Preferably, said battery power supply unit is cylindrical in shape.

Preferably, said at least one circuit board at least partially surrounds said battery power supply unit.

Preferably, the microprocessor is programmed for the management of at least one derailleur.

Preferably, the on-board device comprises a plurality of power supply, signal and/or data cables, more preferably equipped with respective end connectors for connection with at least one other on-board device in an on-board electronic system.

Preferably, each cable protrudes from a longitudinal end face of the on-board device.

Alternatively or additionally, the oblong hollow body of the on-board device can include a second groove extending substantially along its main longitudinal direction, for the passage of at least one cable between the on-board device and the bicycle frame.

As outlined above, the provision of a groove for housing the inserts of the frame provides a series of advantages. The groove can limit the movement of the on-board device within the seat tube, even in the absence of a fastener for fixing the bottle cage, possibly by providing for a slightly forced insertion of one or both of the inserts in the groove, and/or an expanded material around the on-board device.

In another aspect thereof, the invention therefore concerns a bicycle on-board device having an oblong shape and comprising a cavity containing a battery power supply unit and at least one circuit board, the device being sized for insertion into a seat tube or seat tube of a bicycle frame, characterised by having a groove extending along its main longitudinal direction and sized to receive a portion of at least one insert of a bicycle frame intended for fastening the bottle cage.

In another aspect thereof, the invention concerns a method for mounting a device on-board of a bicycle, comprising the steps of inserting said device in a seat tube of a bicycle frame, and fastening said device to the frame with a fastener matching a bottle cage fastener.

Preferably, the method comprises the steps of positioning the device at at least one perforated insert of the bicycle frame intended for fastening the bottle cage, and fixing it with a one bottle cage fastener extending through the perforated insert.

In an embodiment, positioning the device comprises the steps of: providing a through hole in the on-board device, extending substantially perpendicular to a main longitudinal direction of the on-board device, threading a first end of a semi-rigid cable in the hole of a lower insert of the bicycle frame, bringing said first end out from the upper end of the seat tube, passing said first end into the through hole, re-threading said first end in the seat tube, bringing said first end out from the housing box of the bottom bracket assembly, and pulling the two ends of the cable away from the frame.

In an embodiment, positioning the device comprises the step of temporarily fastening a rigid rod to an upper end of the on-board device, of a length such as to still partially protrude from the seat tube when the on-board device is correctly positioned.

Preferred Embodiments

FIG. 1 schematically illustrates a bicycle 100, having an on-board device 10 according to the invention. The bicycle 100 comprises a frame 110, a seat post 130 at least partially inserted in the upper end of a seat tube 112 of the frame 110 and equipped with a saddle 132 at its upper end, handlebars 134, a fork 136 rotatably mounted in a head tube 126, a front wheel 138 rotatably supported at the lower end of the fork 136, a rear wheel 140 rotatably supported at the rear part of the frame 110, a propulsion mechanism 142 and at least one of a front brake 144 and a rear brake 146.

Figure 8:
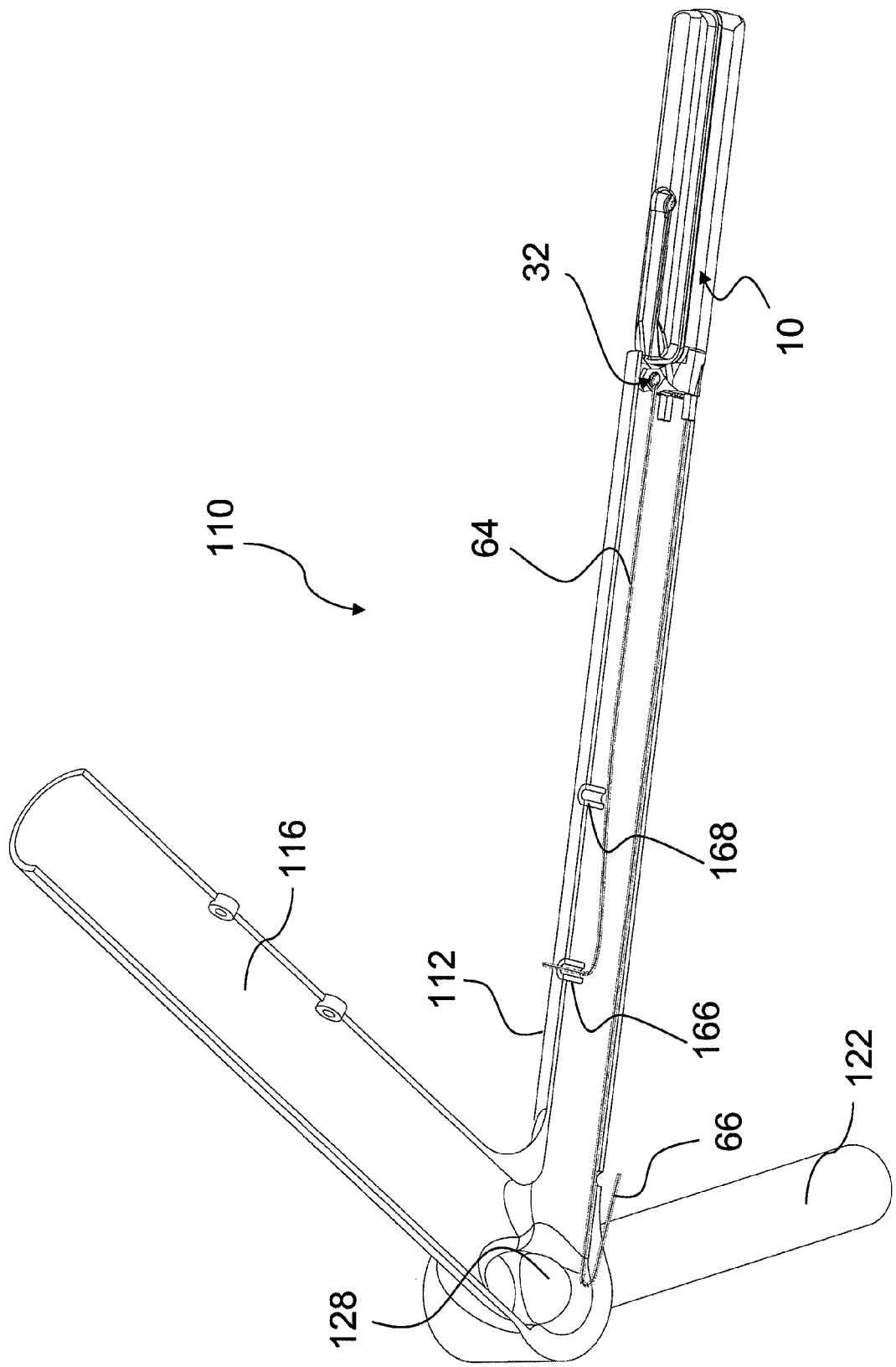
FIG. 8 is a perspective view of the on-board device of FIG. 2, in a mounting step, wherein the bicycle frame is shown partially in section.

The frame 110 in the embodiment shown is of the diamond type, comprising the aforementioned seat tube 112, the aforementioned head tube 126, a top tube 114, a down tube 116, and four rear stays 118, 120, 122, 124 as well as a housing box of the bottom bracket assembly 128 (FIG. 8).

The frame 110 can have other shapes, and in particular it can have an integrated seat post, so that the seat post 130 is absent.

Typically, the propulsion mechanism 142 comprises a pair of crank arms 148, 149 equipped with pedals 150, 151 to drive a shaft of the bottom bracket assembly (not shown) into rotation, rotatably supported in the housing box of the bottom bracket assembly 128 and on which at least one front sprocket 154 is fitted; at least one rear toothed wheel 156 at the rear wheel 140 and a chain 158 extending each time between a front toothed wheel 154 and a rear toothed wheel 156. In the case of a propulsion mechanism 142 with variable transmission ratio, there is also a front derailleur 160 to move the chain 158 among the front toothed wheels 154 and/or a rear derailleur 162 to move the chain 158 among the rear toothed wheels 156.

Devices 164 for controlling the brakes 144, 146 and/or the derailleurs 160, 162 are typically arranged at the ends of the handlebars 134 as shown, or they are fixed in a convenient position on the frame 110. Such devices can comprise levers and/or buttons to generate electrical actuation commands of the brakes 144, 146 and/or of the derailleurs 160, 162, or to actuate them mechanically, like for example through a Bowden cable.

An on-board electronic system mounted on the bicycle 100 comprises one or more of the following devices or components (many of which are not shown): the aforementioned control devices 164, an electric motor for moving each derailleur 160, 162, a position sensor of each derailleur 160, 162, a speed sensor, a pedalling cadence sensor, an inclinometer, a speedometer, a heart rate monitor or other sensors, a display unit, an audio unit, as well as at least one battery power supply unit preferably of the rechargeable type, one or more processors, and memory means for the operation of such devices and/or for collecting and storing data. There can also be a reader of multimedia content such as music, video, images, including geographical map files, a digital camera, a video camera, a voice recording unit, a mobile telephone unit and/or other applications.

The various components described above are connected to each other by cable and/or wirelessly, and they can be placed in various places of the bicycle.

An embodiment of an on-board device 10 according to the invention, which can constitute or be a component of such an on-board electronic system, is shown schematically in FIG. 1 in its condition mounted into the seat tube 112, and in detail in FIGS. 2 to 8.

Figure 2:
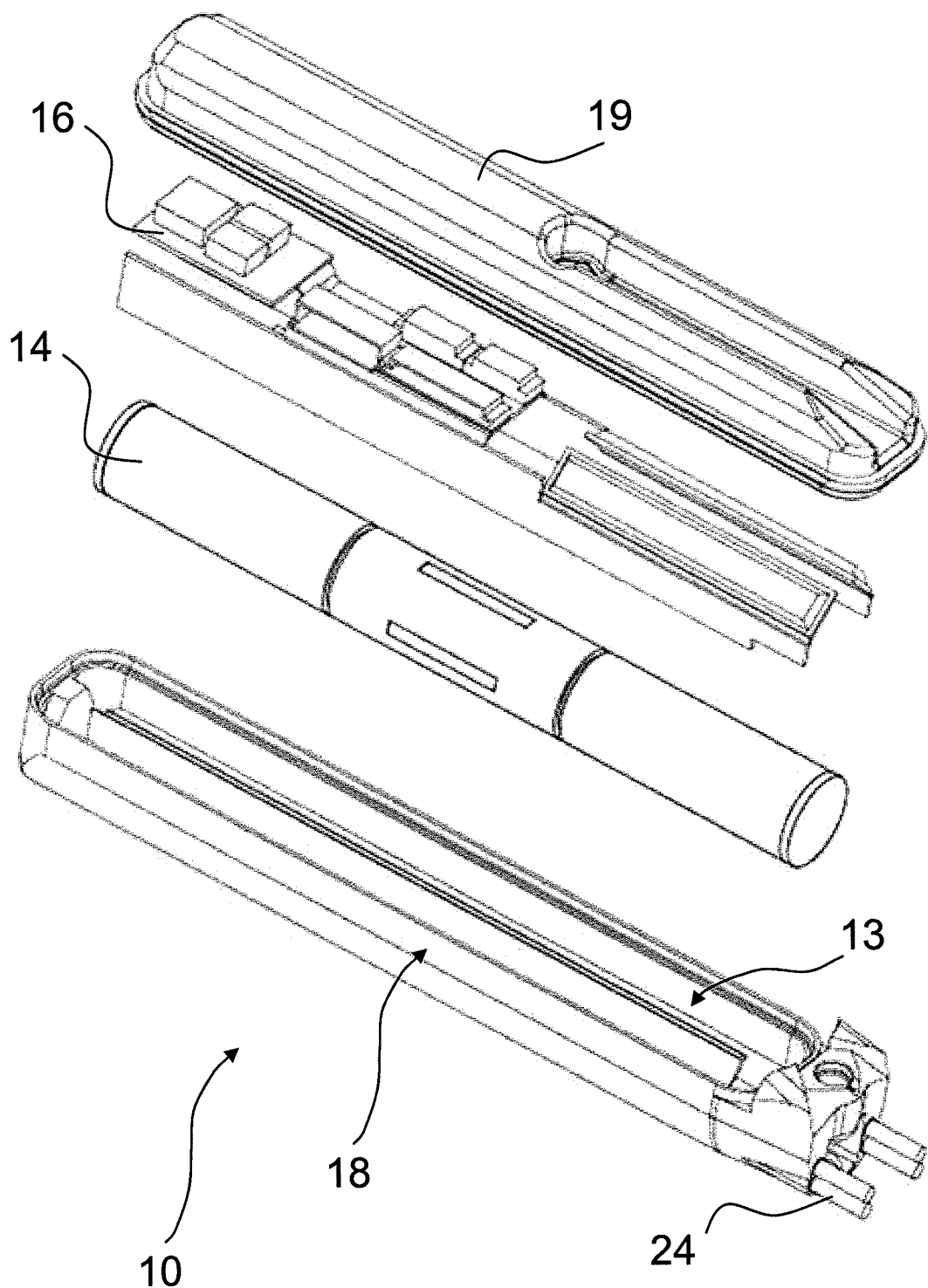
FIG. 2 is an exploded view of an embodiment of an on-board device according to the invention.
Figure 3:
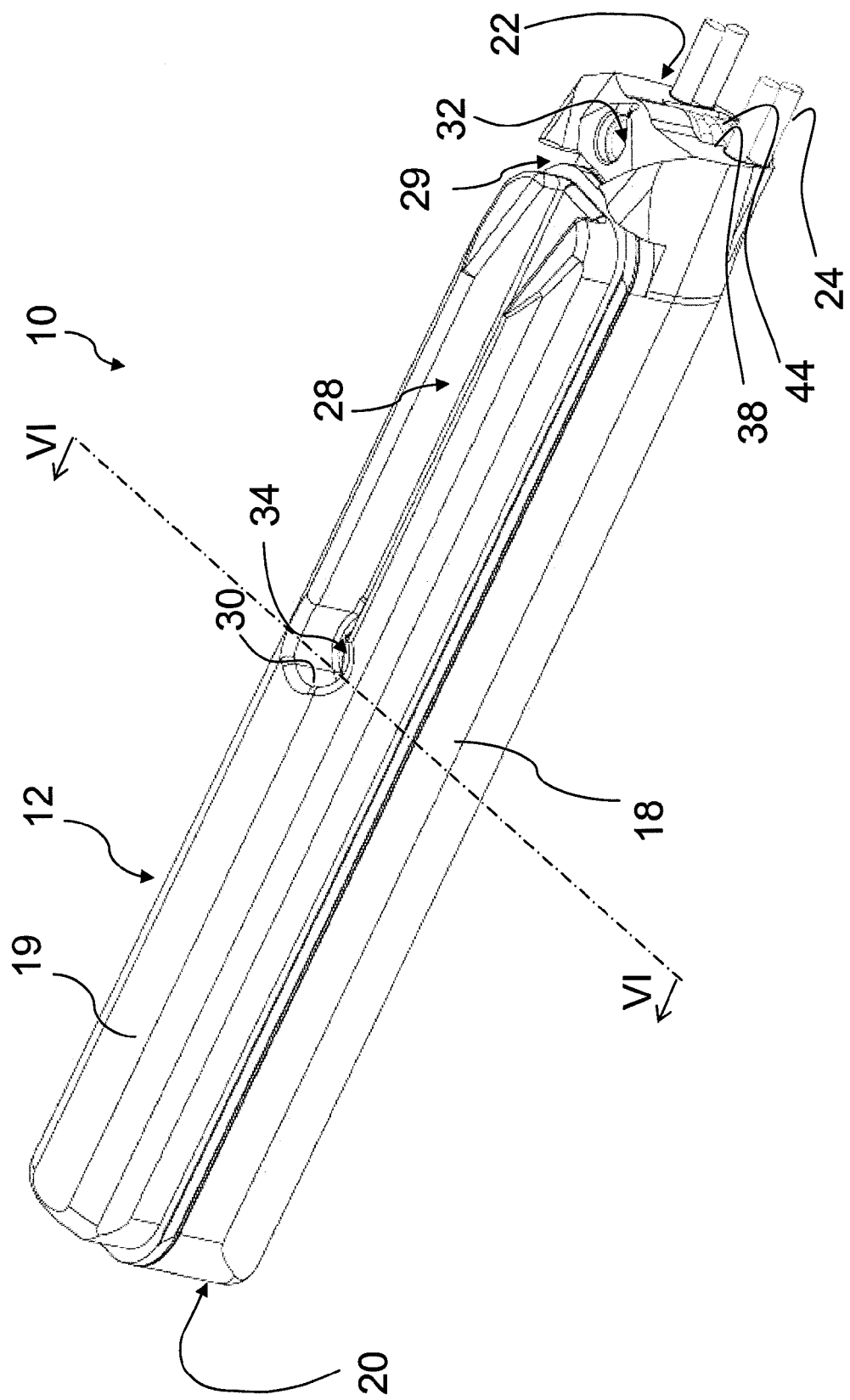
FIG. 3 is a perspective view of the on-board device of FIG. 2.

The on-board device 10 comprises an oblong hollow body 12, see FIGS. 2 and 3, defining an internal cavity 13 in which a battery power supply unit 14 and at least one circuit board 16 are housed.

In the embodiment shown, the circuit board 16 is a so-called power board, namely containing the electronics for controlling the derailleurs 160, 162 and for detecting the position thereof. In this embodiment, the on-board device 10 is connected with the derailleurs 160, 162 and with the manual control devices 164, for example through cables 24. The circuit board 16 can comprise a power supply circuit that receives power from the battery power supply unit 14 and outputs it to other components of the on-board device 10 and/or of the on-board system, a recharging circuit that receives electrical power from an external source such as the mains or a dynamo and outputs it to the battery power supply unit 14, a circuit for managing the derailleurs 160, 162, and a circuit for managing the various sensors.

Electronics for managing the transmission ratios, in a automatic mode or based on manual controls entered for example through the manual control devices 164 or in a semi-automatic mode, also based on signals coming from the possible sensors, is housed in the on-board device 10 and/or in the manual control devices 164.

The oblong hollow body 12 is made, for example, of a plastic material and is configured and sized for being housed inside the seat tube 112. The oblong hollow body 12 has a base 18 and a cover 19 that define a side surface, an upper longitudinal end 20 and a lower longitudinal end 22, see FIG. 3, the adjectives upper and lower being used, in order to make the invention easier to understand, with reference to the mounted condition of the device 10 shown in FIG. 7. In other mounting conditions, the device 10 could be mounted upside down. A plurality of power supply, signal and/or data cables 24 extend from the circuit board 16 and come out from the oblong hollow body 12 at its lower longitudinal end face 22 as shown and/or at its upper longitudinal end face 20.

The cables 24 are preferably equipped with respective removable connectors (not shown) for connection with other devices of the electronic system and/or with a power supply source for recharging the battery power supply unit 14.

Figure 5:
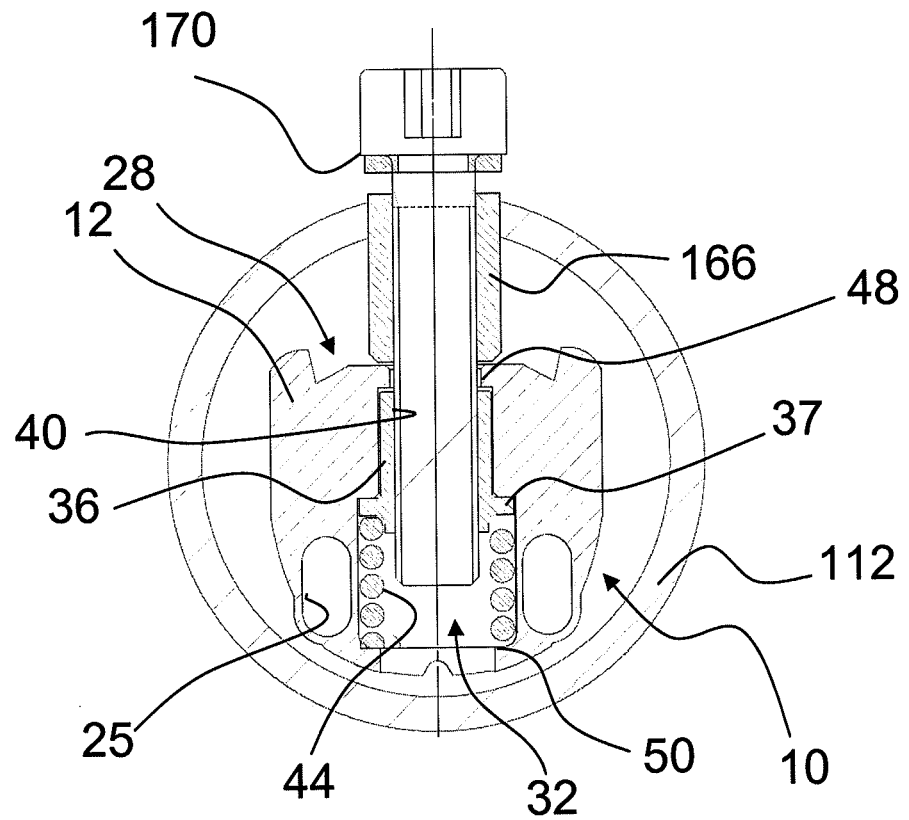
FIG. 5 is a cross sectional view of the on-board device of FIG. 2 in the mounted condition, taken along the section plane V-V of FIG. 7.
Figure 6:
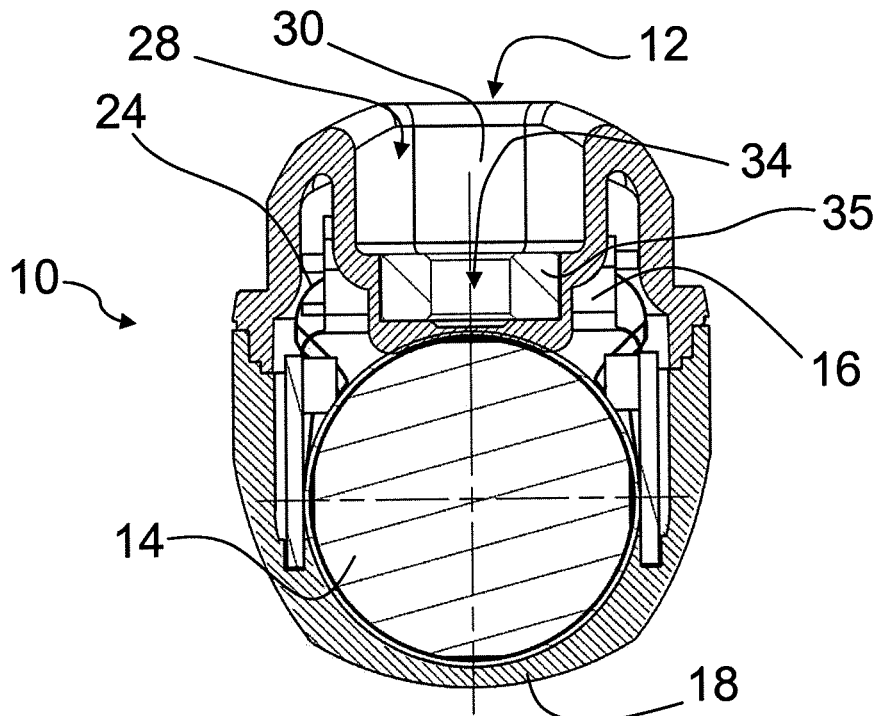
FIG. 6 is a cross sectional view of the on-board device of FIG. 2, taken along the section plane VI-VI of FIG. 3.

The oblong hollow body 12 is advantageously tightly closed. For example, the cover 19 is ultrasound welded, glued or screwed with interposition of a gasket to the base 18. Insulating material can also be provided at the exit of the cables 24 through suitable holes 25 (FIG. 5).

Figure 4:
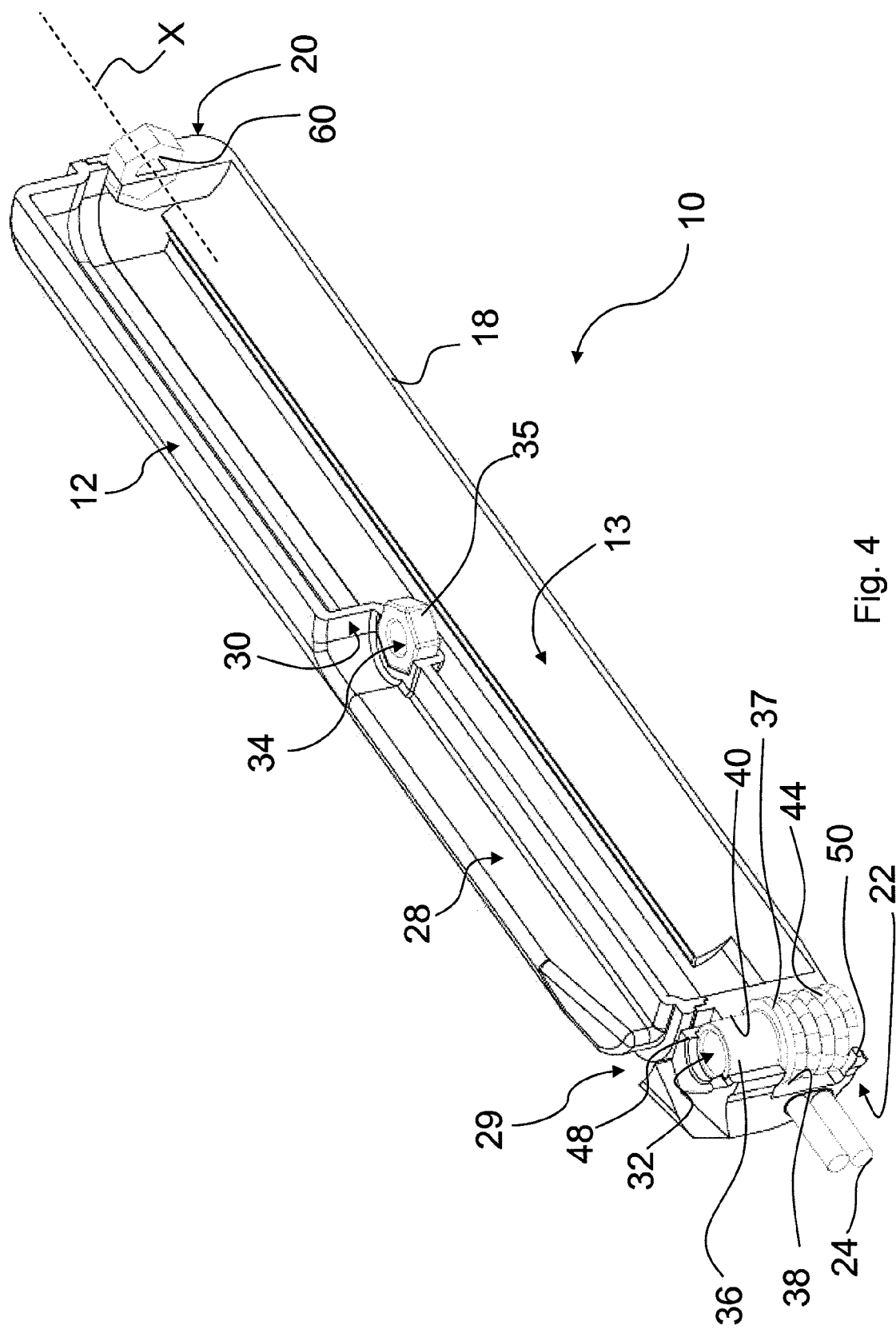
FIG. 4 is a perspective view, partially in longitudinal section, of the on-board device of FIG. 2.

The oblong hollow body 12 has a groove 28 extending parallel to its main longitudinal direction X, hereinafter called axis X for the sake of brevity. The groove 28 extends from the lower end 22. The groove 28 is preferably flared and/or tapered towards the lower end 22. In the embodiment shown, the groove is made in part in the cover 19 and in part in the base 18 of the oblong hollow body 12, and thus it has a short interruption 29. In the embodiment shown, the groove 28 does not extend up to the upper end 20, rather on the contrary it has an abutment surface 30 extending substantially transversal to axis X (FIG. 4).

The groove 28 is sized to receive a portion of two inserts 166, 168 (FIGS. 4, 5, 7) that are arranged in the seat tube 112 for connection with a bottle cage fastener that project towards the inside of the seat tube 112. Alternatively, the groove 28 could receive only the upper insert 168.

Thanks to the described groove 28, the transversal size of the oblong hollow body 12 can correspond elsewhere—and in particular in its upper portion—essentially to the internal transversal size, for example, to the internal diameter, of the seat tube 112 and/or the longitudinal size of the device 10 can be maximized.

The oblong hollow body 12, when slid in the seat tube 112 with the groove 28 in the suitable angular position (about the axis X), "hooks" onto the inserts 166, 168, remaining suspended slightly above the housing box of the bottom bracket assembly 128, see FIG. 8.

In any case, the seating of the inserts 166, 168 in the groove 28, especially if the groove is not oversized or even is slightly undersized so that the seating of the inserts 166, 168 is forced, prevents the rotation of the device 10 about the axis X and also oscillating inclination movements with respect to the axis X.

In order to further avoid the movement of the device 10 inside the seat tube 112, on the bottom of the groove 28, in the embodiment shown there are two holes 32, 34 equipped with an internal threading matching the external threading of two fastener 170,172 (FIG. 7) for attaching a bottle cage (not shown).

In the embodiment shown, the internal threading of the holes 32, 34 is the same as that of the inserts 166, 168. In order to facilitate the engagement of the fastener 170 with the internal threading of the hole 32 despite it being already partially inserted into the insert 166, in the embodiment shown the internally threaded hole 32 on the side of the lower end 22 is made in a bush or sleeve 36 that is housed with clearance in a smooth hole 40 of the oblong hollow body 12, as can be seen more clearly in FIGS. 4, 5. The bush 36 is longitudinally biased, for example by a coil spring 44 acting on a flange 37 of the bush 36, and bush 36 and spring 44 are longitudinally held by abutment surfaces 48, 50. Bush 36 and spring 44 are inserted in the smooth hole 40 through an opening 38 of the oblong body 12.

The internally threaded hole 34 on the upper end 20 could be made similarly, but in the embodiment shown it is a conventional nut 35.

Figure 7:
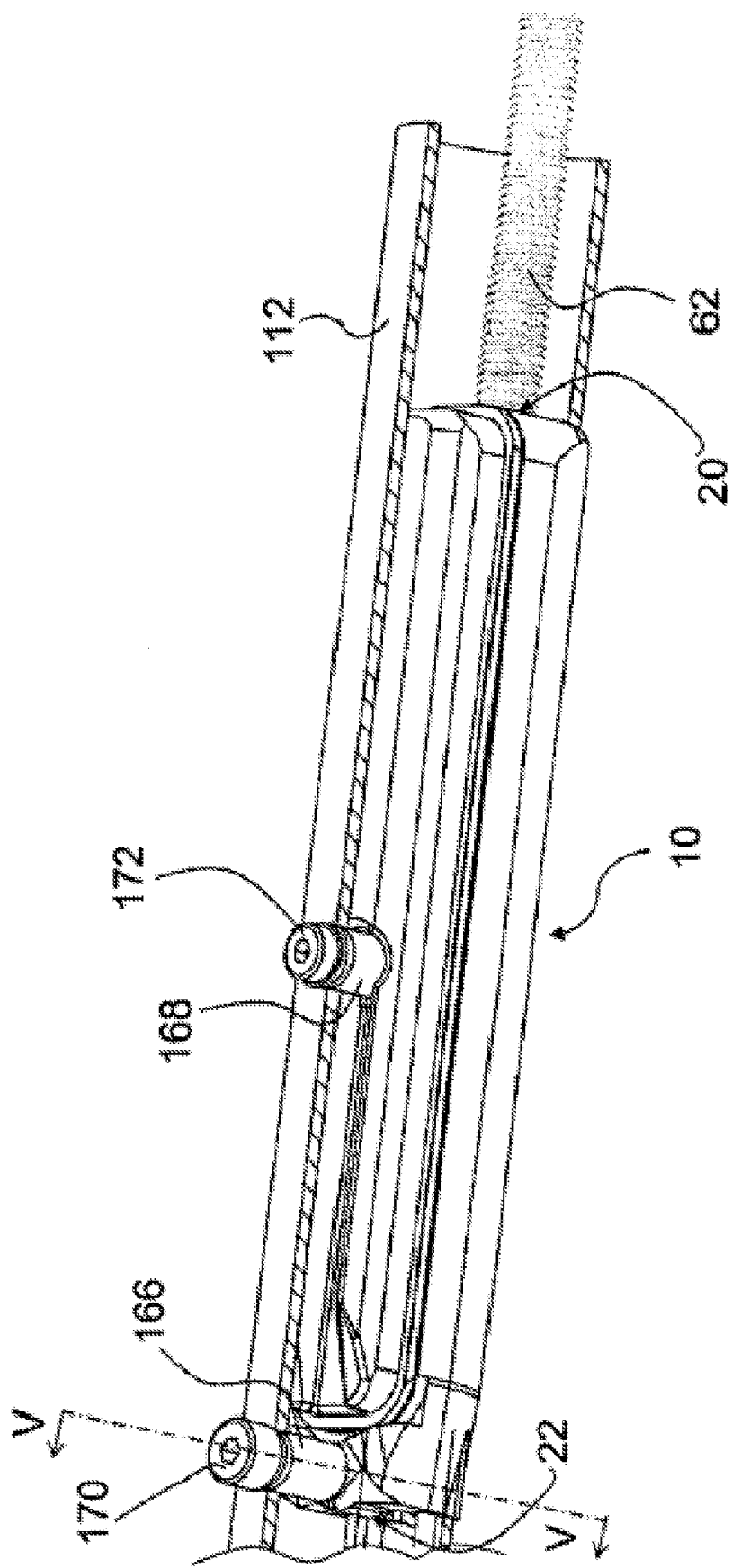
FIG. 7 is a perspective view of the on-board device of FIG. 2, in the mounted condition, wherein the seat tube of the bicycle is shown in section.

As shown with reference to FIGS. 4 and 7, in an embodiment, in the face of the upper longitudinal end 20 of the device 10 there can be an internally threaded hole 60 or a bayonet seat or another seat for temporarily fastening a rigid rod 62, of a length such as to still partially protrude from the seat tube 112 when the on-board device 10 is correctly positioned at the bottle cage, so as to allow the on-board device 10 to be maneuvered to position it correctly. Once the on-board device 10 has been correctly inserted, and after having possibly fixed it with the screws 170, 172 for fastening the bottle cage, the rod 62 is removed from the seat 60 and withdrawn from the seat tube 112.

Alternatively or additionally, as shown in FIG. 8, the hole 32, if it is a through hole as shown, can act as a temporary passage for a flexible semi-rigid cable 64 as a mounting aid. As an alternative to using the hole 32, there can be a special through hole extending in the on-board device 10 substantially perpendicular to the axis X. A first end 66 of the semi-rigid cable 64, for example a steel cable, is threaded in the hole of the lower insert 166 of the frame 110, brought out from the upper end of the seat tube 112, passed into the through hole 32 or into the special seat, re-threaded into the seat tube 112 and brought out from the housing box of the bottom bracket assembly 128. By pulling the two ends of the cable 64 away from the frame 110, the on-board device 10 is positioned correctly, with the hole 32 equipped with internal threading coaxial to the insert 166 of the frame.

Figure 9:
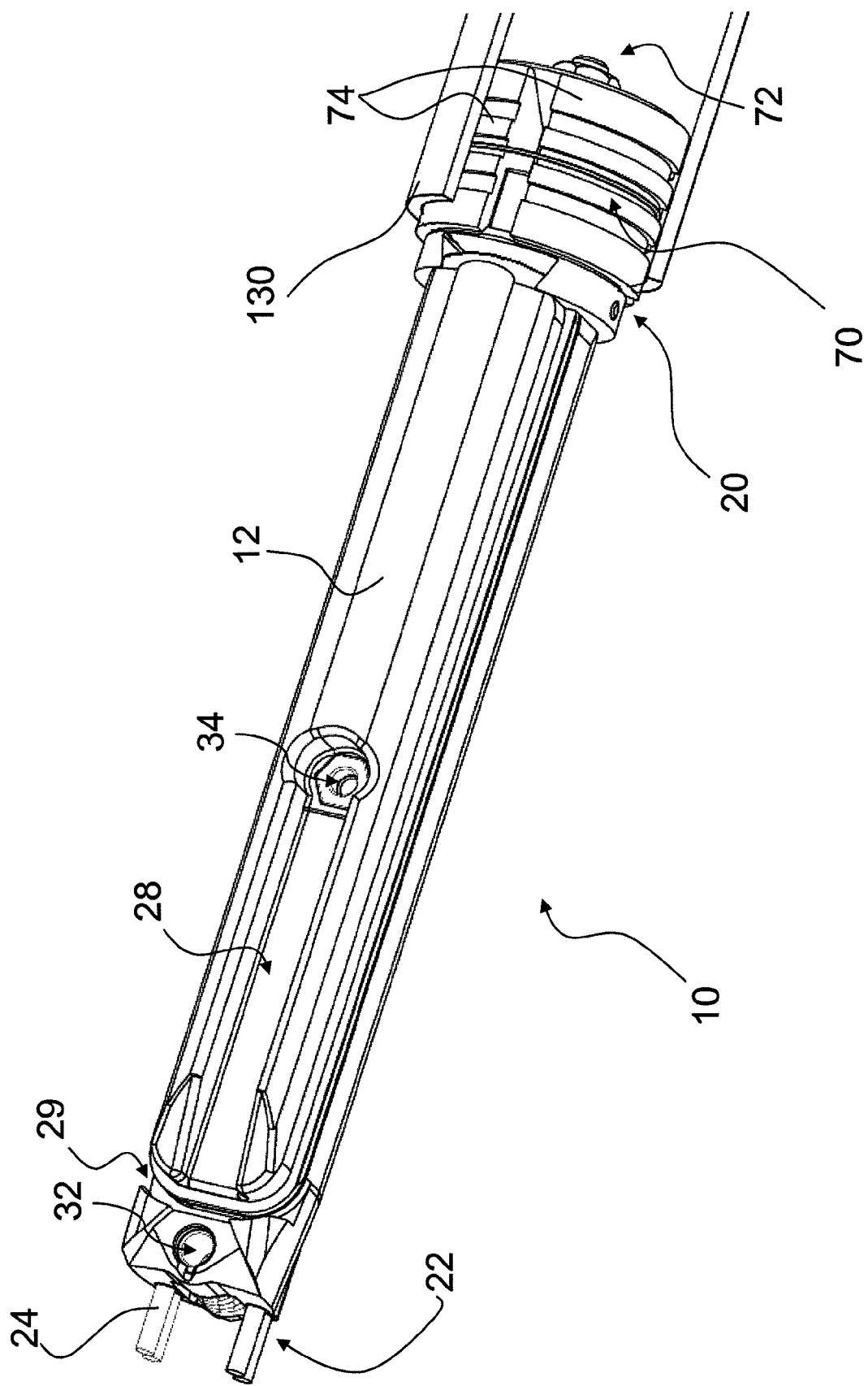
FIG. 9 is a perspective view of the on-board device of FIG. 2, in an alternative mounting condition, wherein the seat post of the bicycle is shown in longitudinal section.
Figure 10:
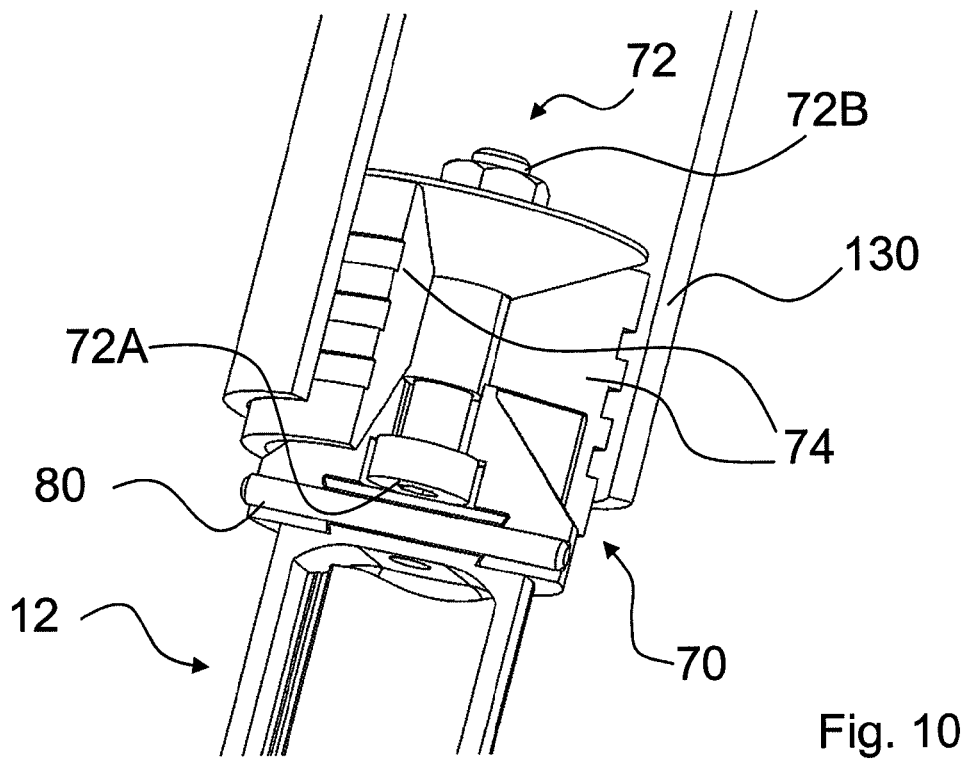
FIG. 10 is a perspective view partially in section of a detail of FIG. 9.
Figure 11:
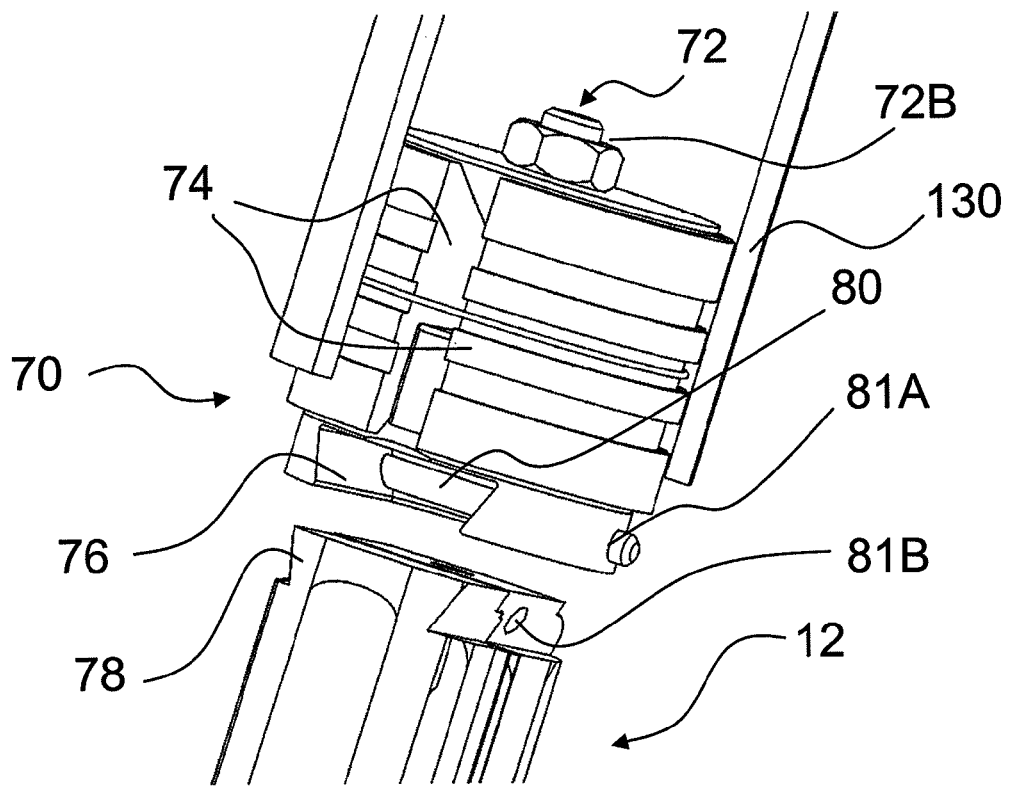
FIG. 11 is a perspective view partially in section of a detail of FIG. 9, in a mounting step.

In the embodiment shown in FIGS. 9, 10, 11, the oblong hollow body 12, at the upper longitudinal end 20, has alternative means for hanging at the seat post 130 (as shown) or at the seat tube 112. The alternative fastener comprises an expander 70 that locks by radial pressure against the inner wall of the seat post 130 (as shown) or of the seat tube 112. The expander 70 is a substantially cylindrical body having an adjuster 72 extending in the axial direction and a plurality of elements 74, the radial extension of which is determined through the adjuster 72. Preferably, both of the ends 72A, 72B of the adjuster 72 are accessible and maneuverable. The expander 70 is shown as a separate component from the oblong hollow body 12, the two being able to be connected together through matching jointing means, preferably of the dovetail type 76, 78. A pin coupling is also provided to prevent the mutual rotary movement about the axis X between expander 70 and oblong hollow body 12, and to make the coupling between the two pieces more secure.

For mounting suspended outside of the seat post 130, the expander 70 is initially inserted in the seat post 130 (FIG. 11) and the adjuster 72 is actuated from the end 72A to lock the expander 70 on the inner surface of the seat post 130; thereafter, the oblong hollow body 12 is fastened to the expander 70 through the dovetail means 76, 78, and preferably fixed by inserting the pin 80 in coaxial holes 81A and 81B, extending transversally in the expander 70 and in the oblong hollow body 12, respectively.

For mounting suspended at the seat tube 112 or inserted in the seat post 130, the oblong hollow body 12 is fastened to the expander 70 through the dovetail means 76, 78 and preferably through the pin coupling; thereafter, the assembly of the two is inserted in the seat tube 112 or in the seat post 130 and the adjuster 72 is actuated from the end 72B to lock the expander 70 on the inner surface of the seat tube 112 or of the seat post 130.

Figure 12:
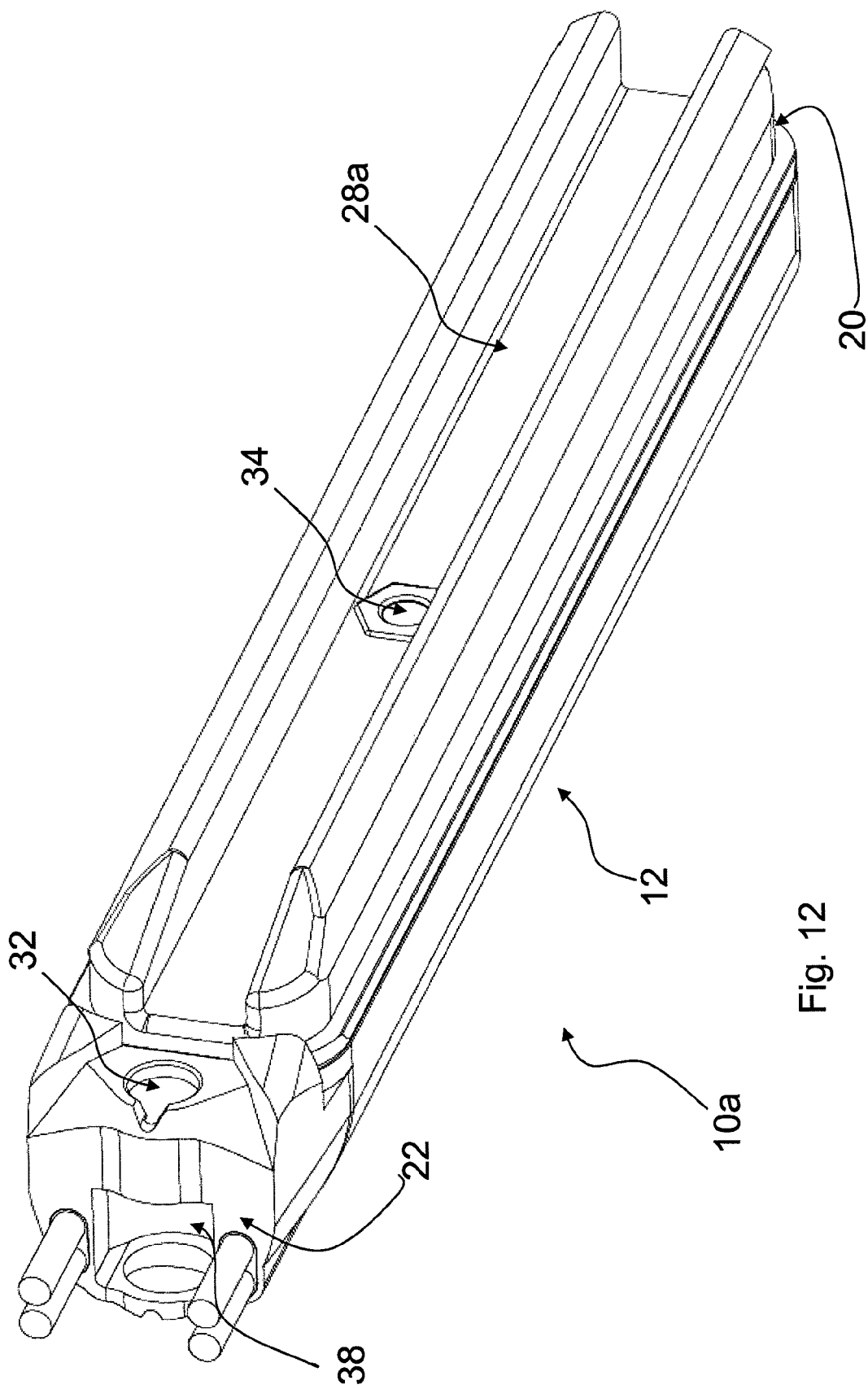
FIG. 12 is a perspective view of another embodiment of an on-board device according to the invention.

FIG. 12 illustrates an embodiment of the device 10a that differs from the one illustrated and described above in that the groove 28a extends for the entire length of the oblong body 12, with the abutment surface 30 being absent.

Figure 13:
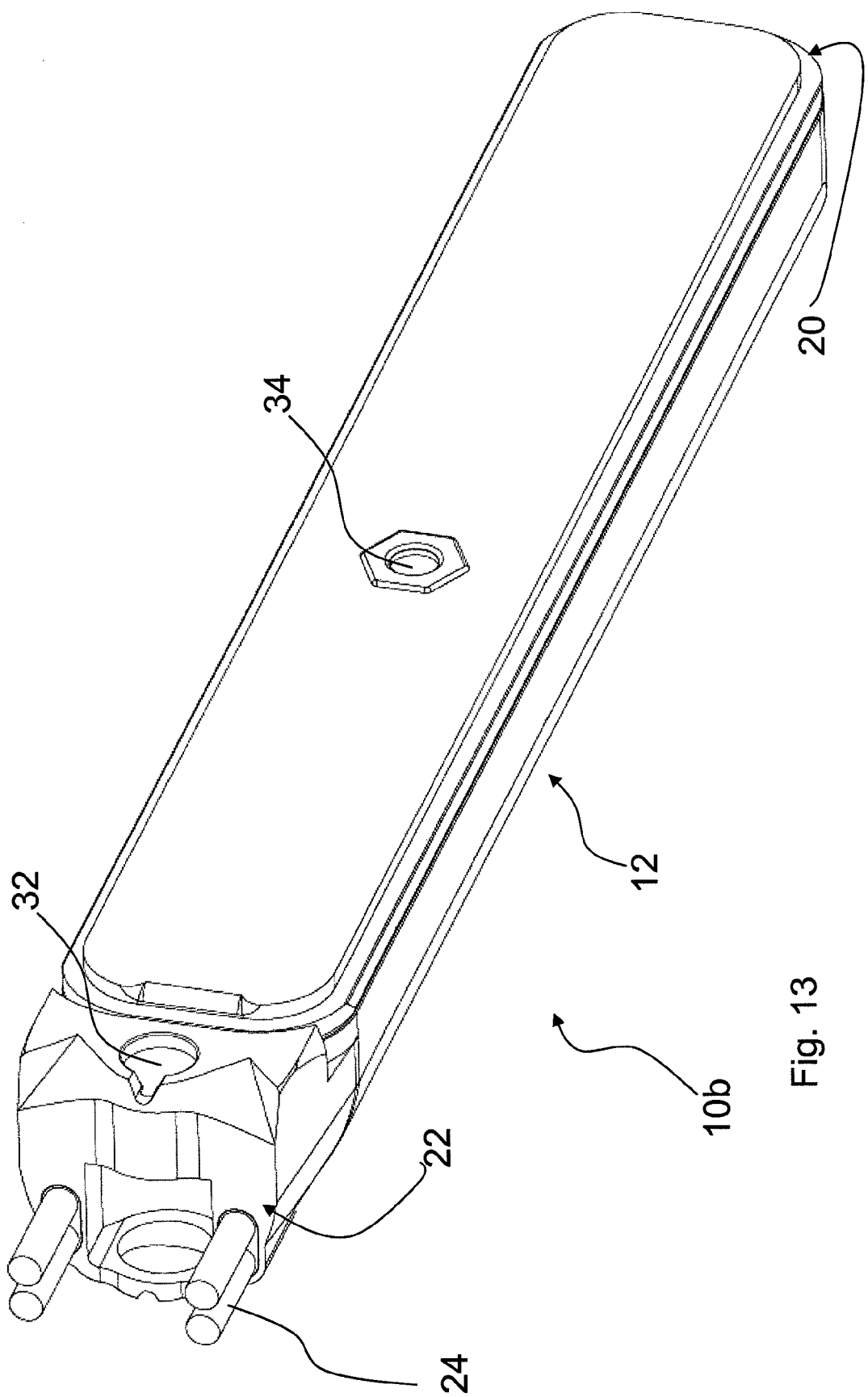
FIG. 13 is a perspective view of another embodiment of an on-board device according to the invention.

FIG. 13 illustrates an embodiment of the device 10b that differs from the ones illustrated and described above in that the groove 28 is absent. In order to increase the internal space of the device 10b, the part on the side of the upper end 20, "upstream" of the hole 34, could have a greater transversal size than the part on the side of the lower end 22, containing the holes 32, 34. In other words, the oblong hollow body 12 could be "stepped".

Figure 14:
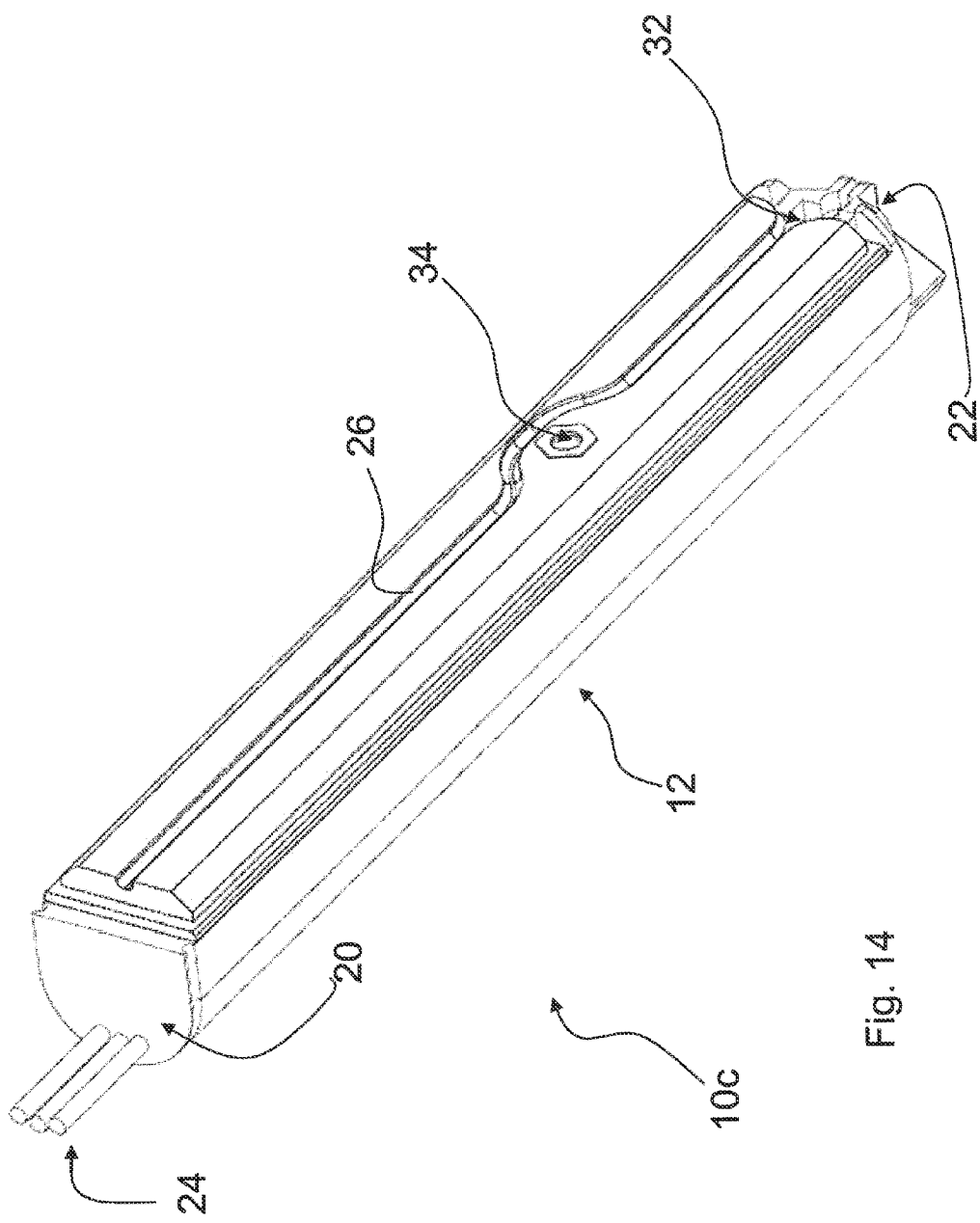
FIG. 14 is a perspective view of another embodiment of an on-board device according to the invention.

FIG. 14 illustrates an embodiment of the device 10c that differs from the one illustrated in FIG. 13 in that it has a groove 26 sized for housing one or more cables 24, which extends substantially in the main longitudinal direction of the oblong hollow body 12 to allow the possible passage of the cables 24 between the oblong hollow body 12 and the seat tube 112 (or the seat post 130). The cables 24 are also shown, as an example, exiting the upper end 20 of the oblong body 12.

The cables 24 can also exit from the side surface of the oblong hollow body 12, on the bottom of the groove 26 for housing the cables where provided for.

Such a groove for cables 26, or even more than one, can also be present in the other embodiments shown.

In the described embodiments, advantageously the groove 28, 28a, with the means 32, 34 for fastening the screws of the bottle cage where provided for, and/or the alternative fastening means such as the expander 70, can be made in a metallic plate that can be removably associated with the oblong hollow body 12, for example made of a plastic material. In this way, it is possible to increase the strength and/or make a single oblong hollow body and a series of plates, each adapted to different sizes and/or distances between centres of inserts 166, 168 for fastening the bottle cage.

Alternatively, at the expenses of the size of the internal cavity 13, it is possible to provide more than one groove 28, 28a, with possible fasteners, in different angular positions (about axis X).

It should be understood that the on-board device described above is also suitable for seat tubes with non-circular cross section and/or for frames with integrated seat post.

Of course, one skilled in the art, in order to satisfy specific and contingent requirements, can make several modifications and variants to the device described above, all of which are in any case encompassed within the scope of protection of the present invention as defined by the following claims.

The invention claimed is:

1. Device that mounts within a portion of a bicycle frame, the device comprising:
    an oblong body that is dimensioned to fit within a cavity defined within a portion of a bicycle frame, defines an interior cavity of sufficient size to receive at least one electronic component, and includes a first portion of a mated fastener pair; and,
    a second portion of said mated fastener pair that joins with said first portion of said mated fastener pair and fixes said body in a defined location within said portion of said bicycle frame.

2. The device according to claim 1, wherein said body comprises an internally threaded hole for receiving an externally threaded fastener associated with said defined location on said portion of said bicycle frame.

3. The device according to claim 1, wherein said body comprises an internally threaded hole including threading that is the same as an internal threading associated with said defined location on said portion of said bicycle frame.

4. The device according to claim 1, wherein the device includes a groove that extends along a longitudinal axis (X) of said body and is sized to receive a portion of an insert through which a bottle cage is fastened to said bicycle frame at at least one fastener location defined on said portion of said bicycle frame.

5. The device according to claim 4, wherein said groove extends along said longitudinal axis (X) from an end of the body to an internal abutment surface positioned along said longitudinal axis (X).

\* \* \* \* \*